(12) United States Patent
Schultz (10) Patent No.: US 9,284,107 B2
(45) Date of Patent: Mar. 15, 2016

(54) PALLET DAMPENING SYSTEM

(71) Applicant: Ecolab USA Inc., St. Paul, MN (US)

(72) Inventor: Jeffrey Michael Schultz, Hudson, WI (US)

(73) Assignee: Ecolab USA Inc., St. Paul, MN (US)

( * ) Notice: Subject to any disclaimer, the term of this patent is extended or adjusted under 35 U.S.C. 154(b) by 288 days.

(21) Appl. No.: 13/633,929

(22) Filed: Oct. 3, 2012

(65) Prior Publication Data
US 2014/0090581 A1    Apr. 3, 2014

(51) Int. Cl.
| | |
|---|---|
| *B65D 19/38* | (2006.01) |
| *F16F 15/08* | (2006.01) |
| *B65D 81/02* | (2006.01) |
| *B65D 19/44* | (2006.01) |
| *F16F 15/067* | (2006.01) |
| *B65D 19/00* | (2006.01) |

(52) U.S. Cl.
CPC ............ *B65D 81/02* (2013.01); *B65D 19/0095* (2013.01); *B65D 19/44* (2013.01); *F16F 15/067* (2013.01); *F16F 15/08* (2013.01); *B65D 2519/00029* (2013.01); *B65D 2519/00064* (2013.01); *B65D 2519/00273* (2013.01); *B65D 2519/00293* (2013.01); *B65D 2519/00323* (2013.01); *B65D 2519/00333* (2013.01); *B65D 2519/00815* (2013.01)

(58) Field of Classification Search
CPC ............... B65D 19/44; B65D 19/0073; B65D 19/0097; B65D 19/38; B65D 2519/00333; F16F 15/08
USPC ......... 248/565, 615, 636, 637, 638, 618, 561, 248/563, 566, 183.3, 188.8, 346.01, 677, 248/619, 623, 646; 108/56.3, 57.26, 57.12, 108/55.33, 136
See application file for complete search history.

(56) References Cited

U.S. PATENT DOCUMENTS

| | | | | |
|---|---|---|---|---|
| 2,597,800 | A | * | 5/1952 | Hussman ....................... 248/565 |
| 3,664,271 | A | * | 5/1972 | Wolder et al. .............. 108/57.26 |

(Continued)

FOREIGN PATENT DOCUMENTS

| | | |
|---|---|---|
| EP | 0 675 049 B1 | 10/1995 |
| GB | 1 266 467 | 3/1972 |

(Continued)

OTHER PUBLICATIONS

JP 10-218182, Fuji Xerox—English, Aug. 18, 1998.
JP 6-115550, Canon—English, Apr. 26, 1994.
Ecolab USA Inc., PCT/US2013/063226 filed Oct. 3, 2013, "The International Search Report and The Written Opinion of The International Searching Authority, or The Declaration", mail date Jan. 22, 2014.
EP 0 675 049 B1 published Oct. 4, 1995, Schoeller Felix Jun Foto—English Translation.
JP 2004-262496 published Sep. 24, 2004, Sanyo Electric Co., Ltd—English Translation.

*Primary Examiner* — Tan Le
(74) *Attorney, Agent, or Firm* — McKee, Vourhees & Sease, PLC (57) ABSTRACT

A method and system for reducing the effects of vibration and shock during transfer of an item on a pallet is provided. The system includes sleeves having recesses therein. The recesses are used to house dampening members, which reduce the vertical movement of the item on the pallet during transport of the item. Blocks may be positioned on the sleeves and may include apertures therethrough to house feet of the item being shipped to aid in providing lateral stability for the item during transfer. In addition, a transition member may be positioned between the feet of the item and the dampening member to increase the surface area on the dampening member to further aid in stabilizing the vertical movement of the item during transport.

18 Claims, 9 Drawing Sheets

(56) References Cited

U.S. PATENT DOCUMENTS

| | | |
|---|---|---|
| 4,362,287 A | 12/1982 | Grongstad |
| 4,565,039 A * | 1/1986 | Oguro et al. ............ 52/167.4 |
| 4,774,892 A | 10/1988 | Ballard et al. |
| 5,344,116 A * | 9/1994 | Winkler ................. 248/677 |
| 5,588,371 A | 12/1996 | Looker |
| 5,970,885 A * | 10/1999 | Polando ................ 108/55.3 |
| 6,418,862 B1 | 7/2002 | Heil |
| 6,648,295 B2 * | 11/2003 | Herren et al. ............ 248/636 |
| 7,096,798 B2 | 8/2006 | Gruber |
| 7,938,070 B2 * | 5/2011 | Shea ..................... 108/56.3 |
| 2005/0028709 A1 | 2/2005 | Carpenter et al. |
| 2007/0283858 A1 | 12/2007 | Ballard |

FOREIGN PATENT DOCUMENTS

| | | |
|---|---|---|
| JP | 6-115550 A | 4/1994 |
| JP | 10-218182 A | 8/1998 |
| JP | 2004-262496 A | 9/2004 |

* cited by examiner

PALLET DAMPENING SYSTEM

FIELD OF THE INVENTION

The present invention relates generally to pallets, which are used to store and transport items. More particularly, but not exclusively, the invention relates to a dampening system in conjunction with a pallet used to reduce stress and damage to the items during transport on the pallets.

BACKGROUND OF THE INVENTION

Conventional pallets are often used for the transportation and storage of large items, such as capital equipment. Such items may include appliances, such as refrigerators, washing machines, dish machines, and the like that can include sensitive components. The palletized loads are normally handled several times, either manually or by fork lift trucks, before reaching their final destination. Though securely attached to a pallet, the items can become damaged by vibrations transmitted through the pallet during handling and transport of the palletized load. This is particularly true when the pallet is being set down on a hard surface or when being transported over rough terrain.

It has been estimated that approximately 45% of issues related to the transport of appliances and other items are due to damage of the items during transport. In addition, the leading cause of damage to the items or machines was shock and vibration that occurred during the distribution cycle of the items. As conventional pallets are rigid, wooden assemblies, they do not absorb much or any of the shock or vibration that occurs during moving and/or transport of the pallet and item. Therefore, the motion is transferred to the item, which can cause damage or dislodging of components. If the items arrive at a final destination with damages, it can be expensive to repair the items, and at times, full replacement may be required. This could be costly and could affect the business of the item manufacture, transporter, and any other entity that may have a part in the sale or transport of the item.

Therefore, there is a need in the art for a system that can modify a conventional pallet to increase the lateral and vertical stability for an item being stored and/or transported on the pallet to reduce the likelihood that the item may become damaged during transport. There is also a need in the art for a system that reduces the vibration and shock experienced by an item on a pallet that is inexpensive and that can be easily modified to transport many types and sizes of items.

SUMMARY OF THE INVENTION

Therefore, it is principal object, feature, and/or advantage of the present invention to provide an apparatus that overcomes the deficiencies in the art.

It is another object, feature, and/or advantage of the present invention to provide a system or apparatus for reducing the effects of vibration and shock on an item during storing and transport.

It is yet another object, feature, and/or advantage of the present invention to provide a system or apparatus for increasing the lateral and vertical stability of an item being transported on a pallet.

It is still another object, feature, and/or advantage of the present invention to provide a system or apparatus that can be quickly and easily added to a conventional pallet to reduce the effects of shock and vibration to an item on the pallet.

It is a further object, feature, and/or advantage of the present invention to provide a system or apparatus for reducing shock and vibrations for an item on a pallet that can be adjusted according to the size of the item.

It is still a further object, feature, and/or advantage of the present invention to provide an apparatus or system that allows multiple dampeners to be used according to the weight of the item on the pallet.

It is yet a further object, feature, and/or advantage of the present invention to provide a pallet dampening system that reduces the damage done during transport.

These and/or other objects, features, and advantages of the present invention will be apparent to those skilled in the art. The present invention is not to be limited to or by these objects, features and advantages. No single embodiment need provide each and every object, feature, or advantage.

According to one aspect of the present invention, a dampening system for use with transporting an item is provided. The system includes first and second sleeves spaced apart from one another. A dampening member is positioned within at least one recess of each of the first and second sleeves. A block is positioned adjacent the at least one recess of the sleeves to aid in providing lateral stability for the item being shipped.

According to another aspect of the present invention, a dampening system for use with moving an item on a pallet having first and second layers of longitudinal extending surface boards attached to one another by a plurality of oppositely extending support boards is provided. The system includes first and second sleeves secured to the first layer of surface boards of the pallet, the first and second sleeves each comprising at least one recess therein; a dampening member positioned within each of the at least one recess of the first and second sleeves to provide vertical stability for the item; a transitional member positioned adjacent the dampening member for providing greater surface area to contact the item; and a block positioned adjacent each of the at least one recess of the first and second sleeves for providing lateral stability for the item.

According to yet another aspect of the present invention, a dampening system for use with moving an item on a pallet having first and second layers of longitudinal extending surface boards attached to one another by a plurality of oppositely extending support boards is provided. The system includes first and second sleeves secured to the first layer of surface boards of the pallet, the first and second sleeves each comprising a plurality of recesses therein; and a dampening member positioned within each of the recesses of the first and second sleeves to provide vertical stability for the item.

DETAILED DESCRIPTION OF THE PREFERRED EMBODIMENTS

Figure 1:
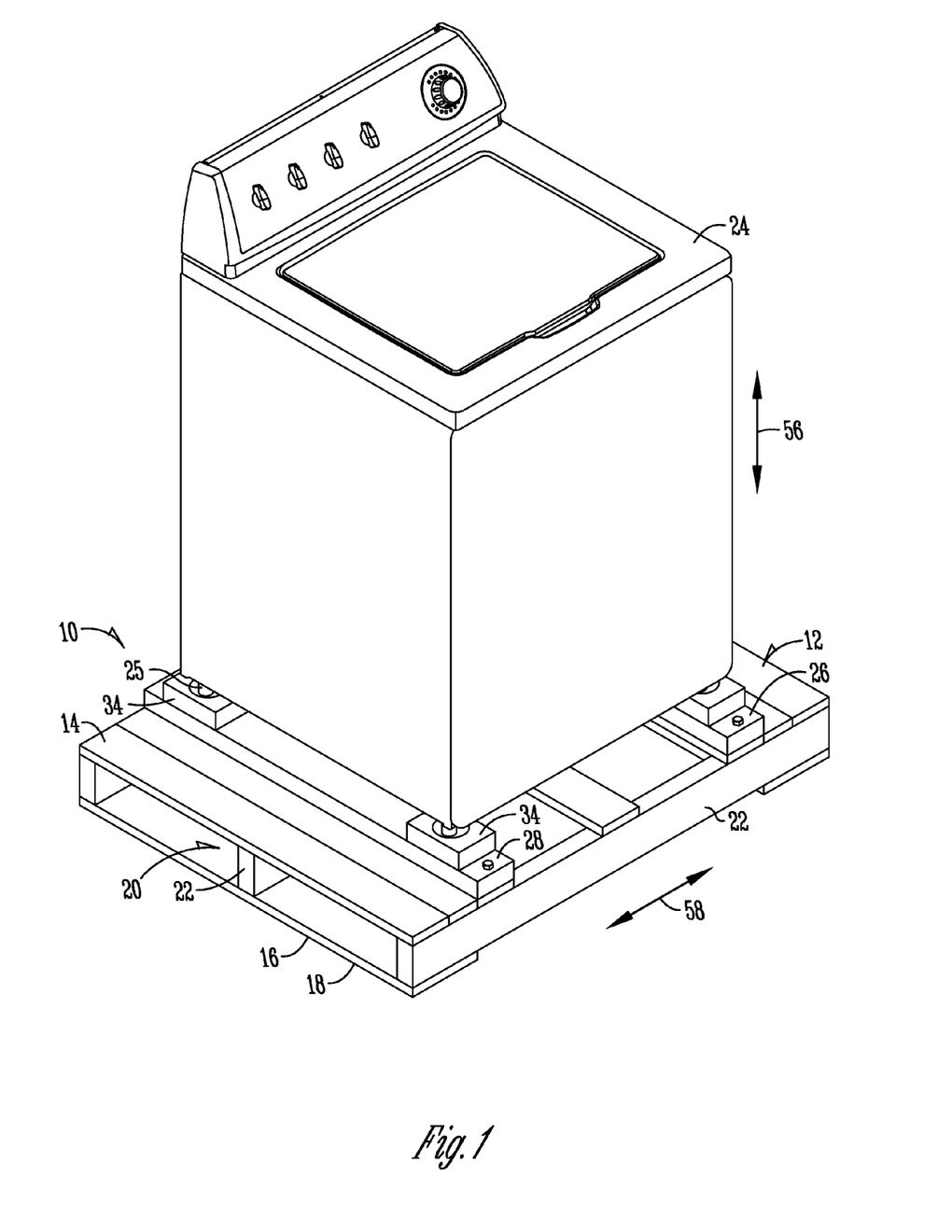
FIG. 1 is a perspective view of an item on a pallet including the dampening system of the present invention.
Figure 2:
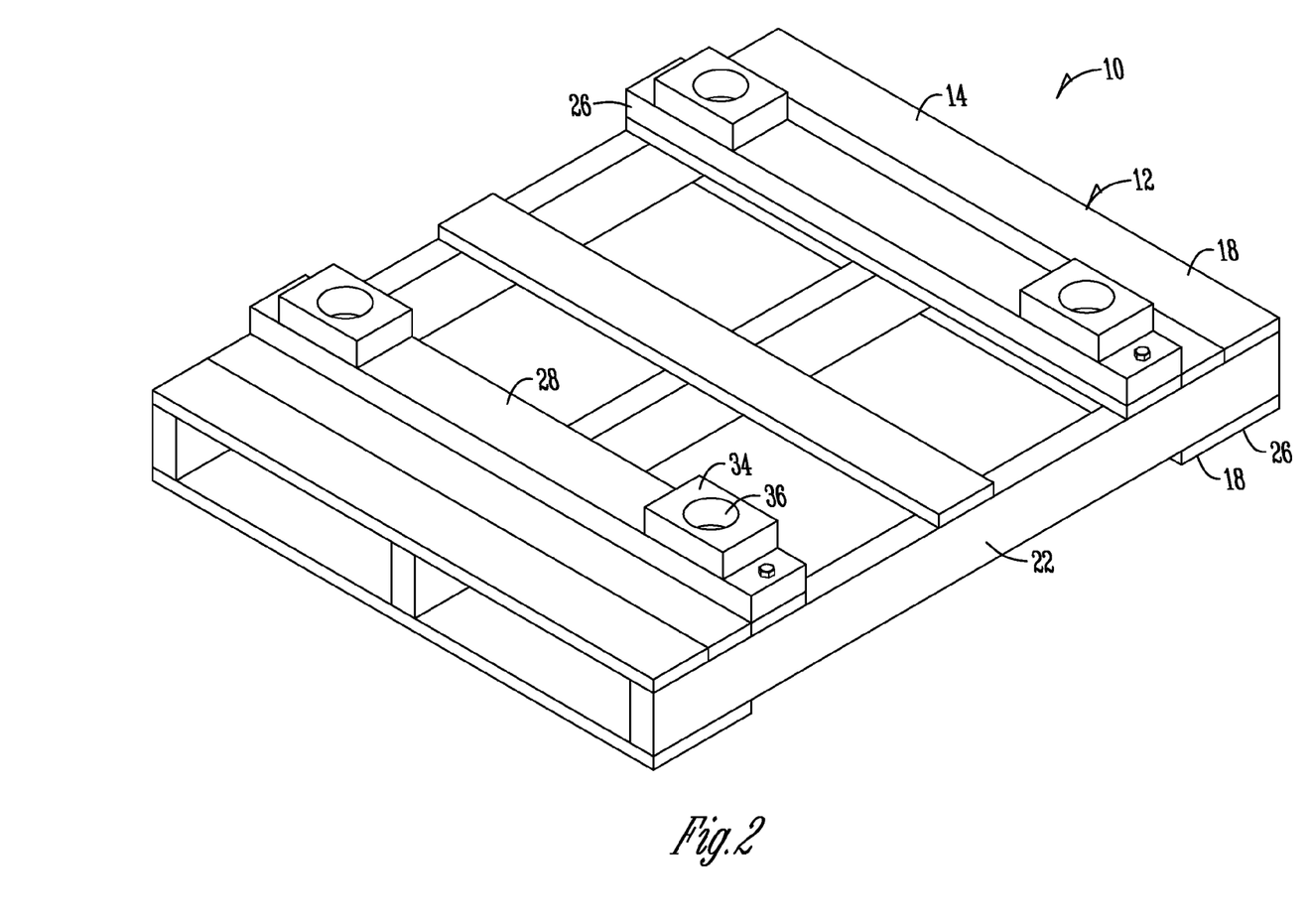
FIG. 2 is a perspective view similar to FIG. 1 without the item on the pallet.

FIG. 1 is a perspective view of an item 24 on a conventional pallet 12 including a dampening system 10 according to an embodiment of the present invention. As shown, the pallet 12 is a conventional wooden-type pallet having first and second layers 14, 16, comprising surface boards 18. The first and second layers 14, 16 of the pallet 12 are generally parallel to one another and include a plurality of surface boards 18. The number and configuration of the boards 18 are shown to be extending longitudinally adjacent one another. However, the invention is not to be limited by such a configuration. Furthermore, a middle layer 20 comprising support boards 22 extending between the first and second layers 14, 16 is shown. The support boards 22 are shown to extend the opposite direction than the support boards 18. The multiple layers of the conventional pallet 12 provide strength and support for holding items, such as that shown in FIG. 1. However, it is to be understood that the present invention is not to be used solely with the wooden-style conventional pallets as shown in FIG. 1. For example, the present invention contemplates the use of the dampening system 10 with any style pallet, including but not limited to, plastic, metal, and paper. It should further be appreciated that while the term "pallet" is used for the present invention, the more generic "skid" or "shipping apparatus" may be used as well.

As noted, pallets are generally used to support and transport an item, such as the item 24 shown in FIG. 1. The use of pallets allows the item 24 to be moved by forklifts, jacks, loaders, or the like, as well as to be transported in trucks, trains, airplanes, and the like, without damaging the items. For example, such items that may be shipped with pallets may include appliances, such as refrigerators, washing machines, dish machines, washers, or the like. Other types of goods or shipping containers may also be placed on the pallet for transport.

As noted, the pallets 12 may be moved by forklift or other device, or maybe placed in a transport vehicle to be transported to another location. The force of the lifting and setting down of the pallets 12 and item 24 can cause a shock or jolt felt by the pallet/item combination. Furthermore, during transport in the transport vehicle, the pallets 12 and items 24 stored thereon may experience additional shock as well as vibration transferred from the transport vehicle. The shock and vibration may be in both a vertical direction (arrow 56) and lateral direction (arrow 58), as well as any direction in between. This shock and vibration is also transferred to the item 24 on the pallet 12, and can cause damage to the item 24 during movement or transport of the pallet/item assembly. Thus, the present invention contemplates the inclusion of a dampening system 10 for use with pallets 12 and moving or transporting items 24.

An embodiment of the dampening system 10 of the present invention is shown in FIGS. 1-5. The system 10 includes first and second sleeves 26, 28 extending lengthwise on the pallet 12. The sleeves 26, 28 may be boards or blocks or other members that can be placed on the first layer 14 of the pallet 12 and secured thereto. For example, the figures shown that the first and second sleeves 26, 28 are bolted to the first layer 14 of the pallet 12. However, the present invention contemplates that other methods of securing the sleeves 26, 28 to the pallet 12 may be used, such as tape, glue or other adhesive, nails, rivets, pins, locks, or the like. Furthermore, while the figures show the first and second sleeves 26, 28 extending the same way and being generally parallel to one another, the present invention contemplates that the sleeves 26, 28 may be secured to the pallet 12 in any manner or configuration necessary. For example, some items to be shipped on the pallet 12 may be triangularly or otherwise-shaped. Therefore, the sleeves 26, 28 can to be positioned on the pallet 12 such that the sleeves 26, 28 provide support in the proper direction. Thus, when a triangular shaped item is being shipped, it may be necessary to have these sleeves 26, 28 in a triangle shape as well, which may also necessitate the addition of another sleeve. Therefore, the present invention also contemplates that more than two sleeves may be used with the dampening system 10 of the present invention, or that only one sleeve be used.

The sleeves 26, 28 also include recesses 30 extending therein. The recesses 30 are generally apertures or cutouts in the sleeves 26, 28, and may extend entirely through the sleeves. Positioned within the recesses 30 of the sleeves 26, 28 are dampening members 32. The dampening members 32 shown in FIGS. 1-5 are dome or hemisphere-shaped pieces of polyurethane or other rubbers. Other materials that can be used for the dampening members include, but are not limited to, natural rubber, synthetic rubber, or vinyl chloride elastomeric resins. However, one type of polyurethane that has been found to work is Sorbethane®, which can be purchased from Sorbethane, Inc., 2144 State Route 59 Kent, Ohio 44240. However, it is to be appreciated that other model numbers, as well as other manufacturers, may be used. Therefore, the dampening members 32 include a dome shape 38 and a flat portion 40 opposite the dome shape 38. The flat portion 40 of the dome shape dampening member 32 is positioned in the recess 30 of the sleeves 26, 28 with the dome portion 38 extending generally upwardly.

As previously stated, the dome shaped dampening member 32 comprises a polyurethane or other rubber or rubber-type material. This allows the dampening member 32 to deform upon a force being applied thereto. Thus, the vibration transfer to the item 24, as shown generally by the arrow 56 in the figures, is transferred to dampening member 32. The vertical movement of the item creates a force on the dampening member 32 to deform the dampening member 32. However, as the dampening member 32 includes a generally pliable material, this movement is lessened or softened by the deformation of the dampening member 32. Thus, the vertical movement of the item 24 is reduced by the inclusion of the dampening member 32. Other shapes of polyurethane or rubber-type dampening members 32 may be included as well; however, the dome shape provides one method of allowing the deformation of said dampening member 32.

Figure 3:
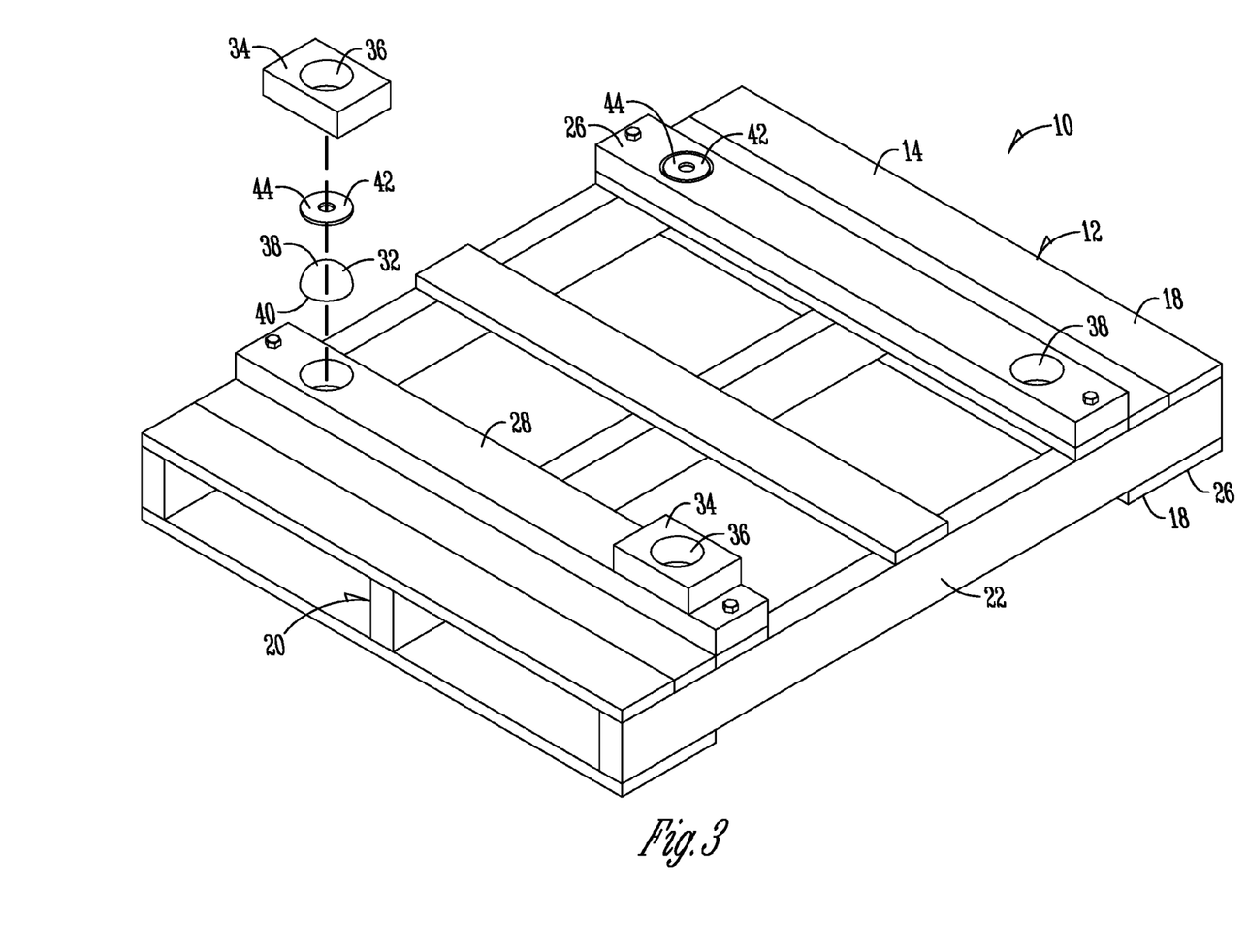
FIG. 3 is an exploded view of the pallet dampening system according to an embodiment of the present invention.
Figure 4:
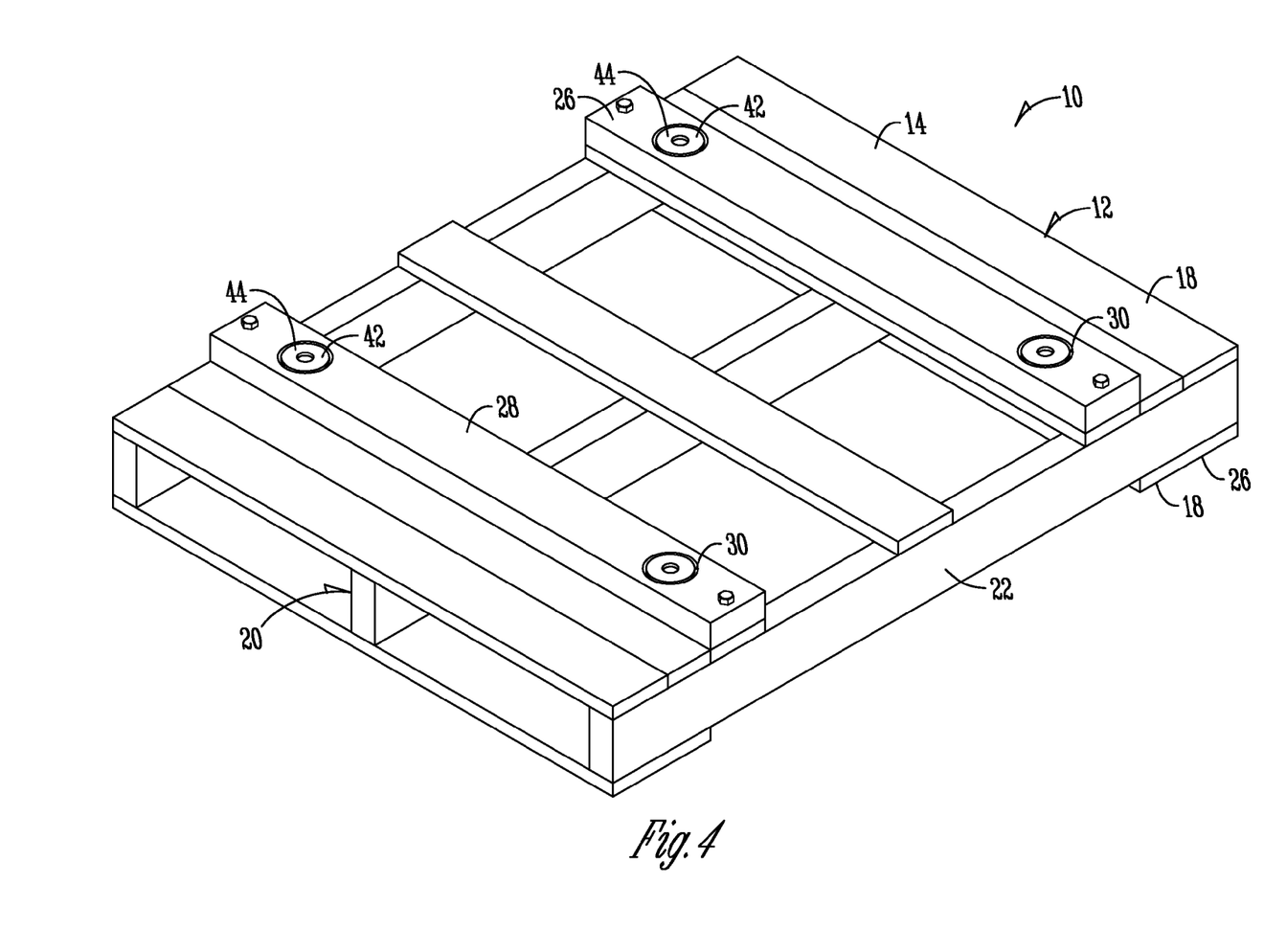
FIG. 4 is a perspective view of the pallet and dampening system according to an embodiment of the present invention.
Figure 5:
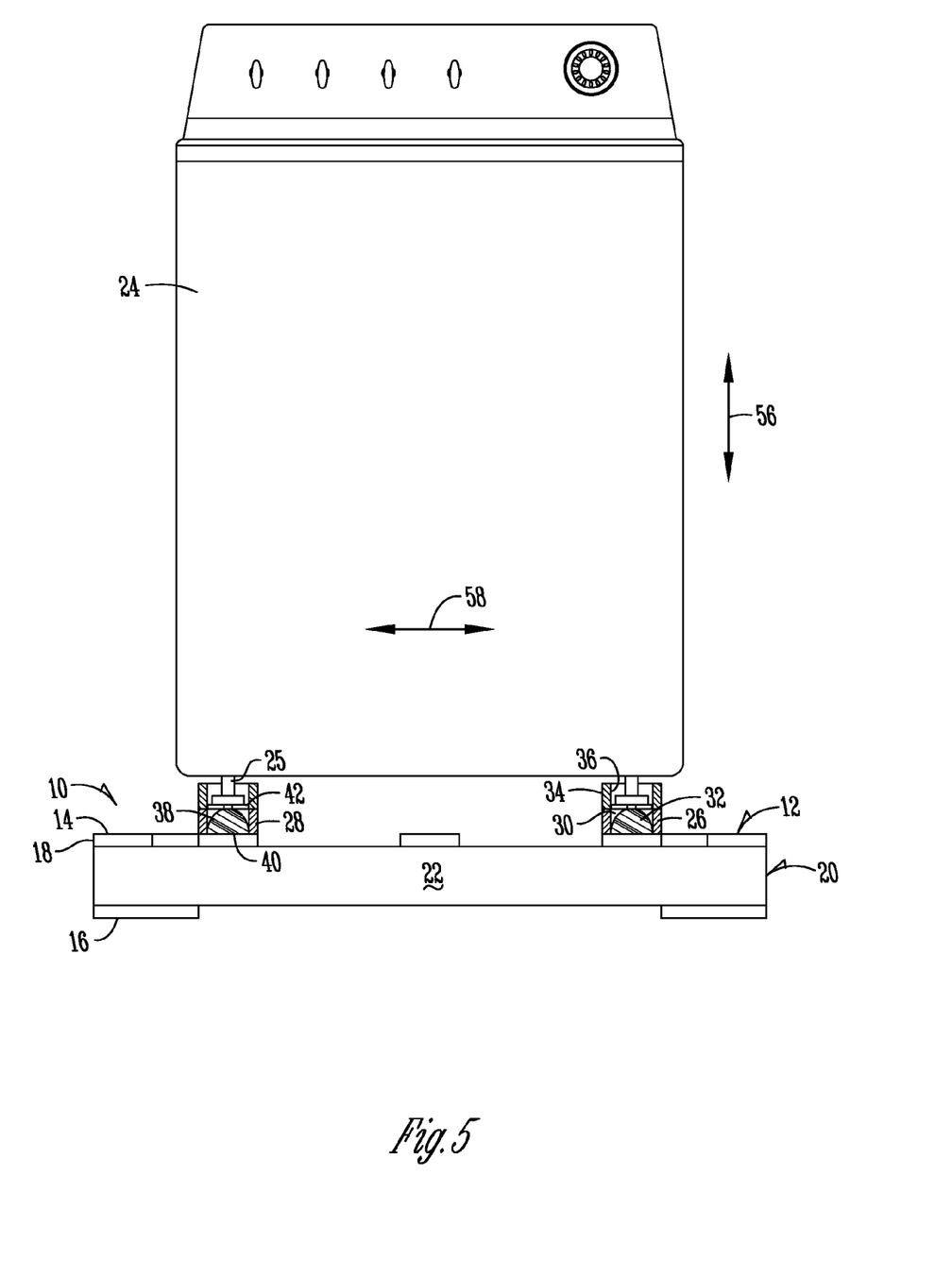
FIG. 5 is a sectional view of the pallet and dampening system of FIG. 1.

As shown in FIGS. 3-5, positioned generally adjacent the dome portion 38 of the dampening member 32 is a disc-shaped transitional member 42. As the dampening member 32 includes the dome or hemisphere shaped portion, less surface area is provided for contact with a foot 25 of the item 24 stored on the pallet 12. Therefore, a disc-shaped transitional member 42, such as a washer or other disc-shaped member, may be positioned between the foot 25 of the item 24 and the dome-shaped portion 38 of the dampening member 32. The transitional member 42 includes a relatively flat or planar surface 44 that may contact the bottom of the foot 25 of the item 24 such that increased surface area is being supported by the transitional member 42. Therefore, the inclusion of the transitional member 42 reduces the likelihood of slippage or lateral movement of the item 24 on the dampening member 32.

Also shown in the Figures is a plurality of blocks 34 positioned on the first and second sleeves 26, 28. The blocks 34 include apertures 36 therethrough, which are aligned with the recesses 30 of the sleeves 26, 28. As shown best in FIG. 5, the block apertures 36 provide a housing or recess for the feet 25 of the item 24 to be inserted. Therefore, the blocks 34 provide a lateral direction restriction for the item 24. The vibration and shock experienced by the item 24 on the pallet 12 includes both a vertical component, which is shown generally by the arrow 56 in the figures, and a lateral component, which is shown generally by the arrows 58 in the figures. As the dampening member 32 provides a relief and stability from the vertical component, the blocks 34 will provide relief and constraints for the lateral component of the vibration and shocks. The combination of the dampening member 32 and the blocks 34 will therefore reduce the vibration and shock felt by the item 24 during movement and transport of the item 24. This will also reduce the maximum acceleration felt by the item 24. For example, it has been shown that the use of the dampening system 10 of the present invention can reduce the maximum acceleration experienced by the item 24 by up to and surpassing 50%, as compared to placing the item 24 directly on a pallet without the use of the dampening system 10 of the present invention. Thus, as the item 24 experiences less acceleration and movement, there will be less damage to the item 24 during movement in transport thereof.

Use of the dampening system 10 of the present invention may be shown best with FIG. 5, which is a sectional view of the item 24 being transported on a pallet 12 including the use of the dampening system 10. As noted, the first and second sleeves 26, 28 are attached other otherwise secured to a top layer 14 of the pallet 12. The dampening members 32 may then be inserted into the recesses 30 of the sleeves 26, 28. The dampening members 32 may be fixed to the bottom of the recess 30 by use of an adhesive; however, the present invention also contemplates that no adhesive or securement be required. The transitional member 42 can then be placed on each of the dampening members 32 to create the configuration shown in FIG. 4. The blocks 34 can then be positioned on the sleeves 26, 28 with the apertures 36 of the blocks 34 aligned generally with the recesses 30 of the sleeves 26, 28. The blocks 34 may be secured or affixed to the sleeves 26, 28 to prevent movement of the blocks 34. Therefore, the blocks 34 may be adhered to the sleeves 26, 28 by use of an adhesive, bolts, screws, nails, or the like. An item 24 is then positioned on the pallet 12 with the feet 25 inserted into the block apertures 36. The bottom of the feet 25 will contact the transitional member 42, which passes a force onto the dampening members 32. The item 24 may further be secured by the use of straps 54 or other securing members to further secure the item 24 to the pallet 12.

The item 24 is now ready for movement and transport on the platform pallet 12. A forklift, jack, or the like can move the pallets 12 and item 24 to a location for transport. During transport, vibrations and shocks will create movement as shown by the arrows 56, 58 in FIG. 5. As noted, however, the effect of the vibration and shocks will be lessened by the use of the dampening system 10. For example, the vertical movement will be reduced due to the deformation of the dampening member 32. The lateral movement will be constrained or reduced by the feet 25 being constricted in the block apertures 36. Therefore, less stress will be felt by the item 24, which will result in a reduced likelihood of damage or displacement of any component of the item 24. Once the item 24 has reached its final destination, the item 24 may be removed from the pallet 12 and dampening system 10 by simply lifting the item 24 to lift the feet 25 out of the block apertures 36.

Figure 6:
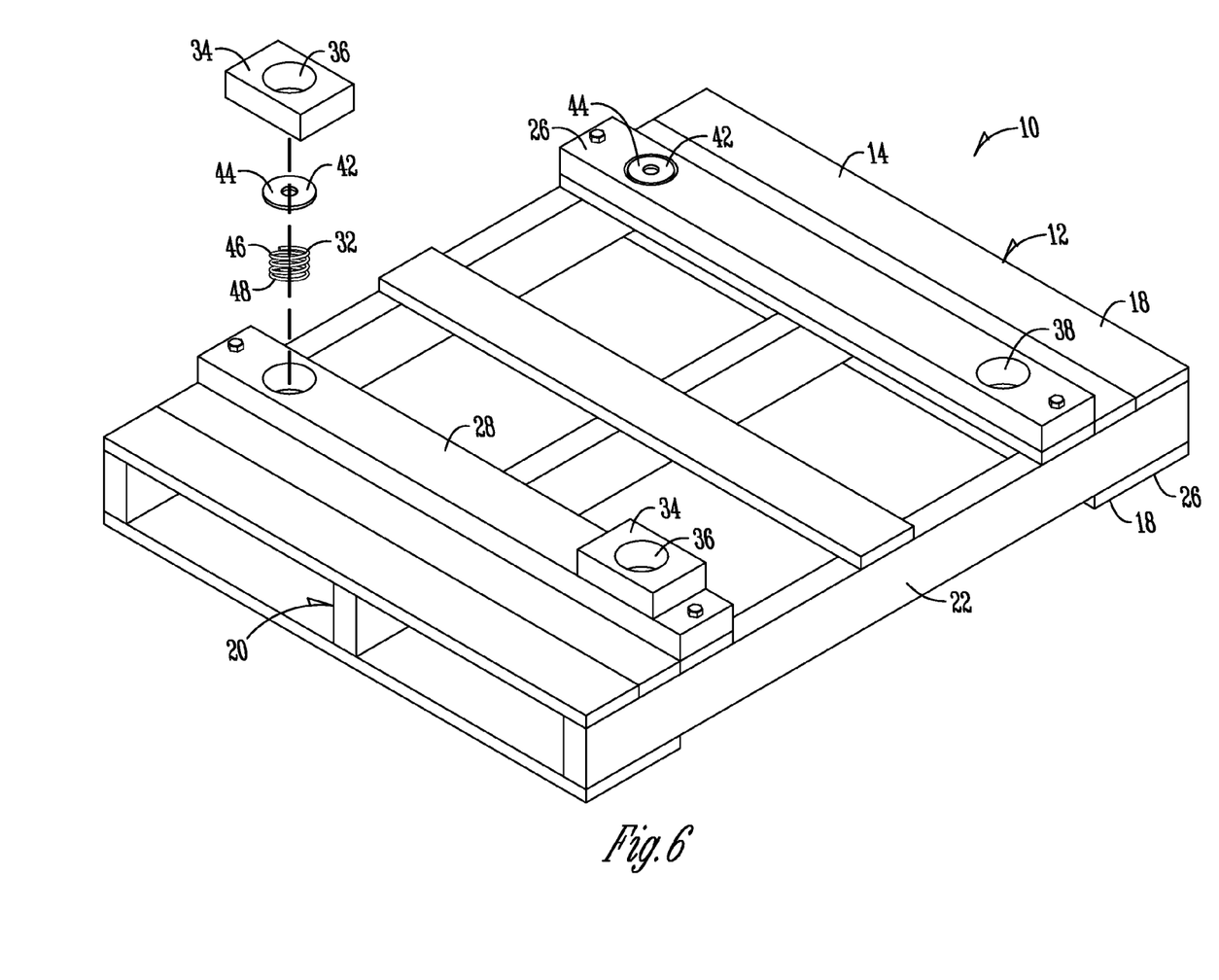
FIG. 6 is an exploded view of the pallet dampening system according to an embodiment of the present invention.
Figure 7:
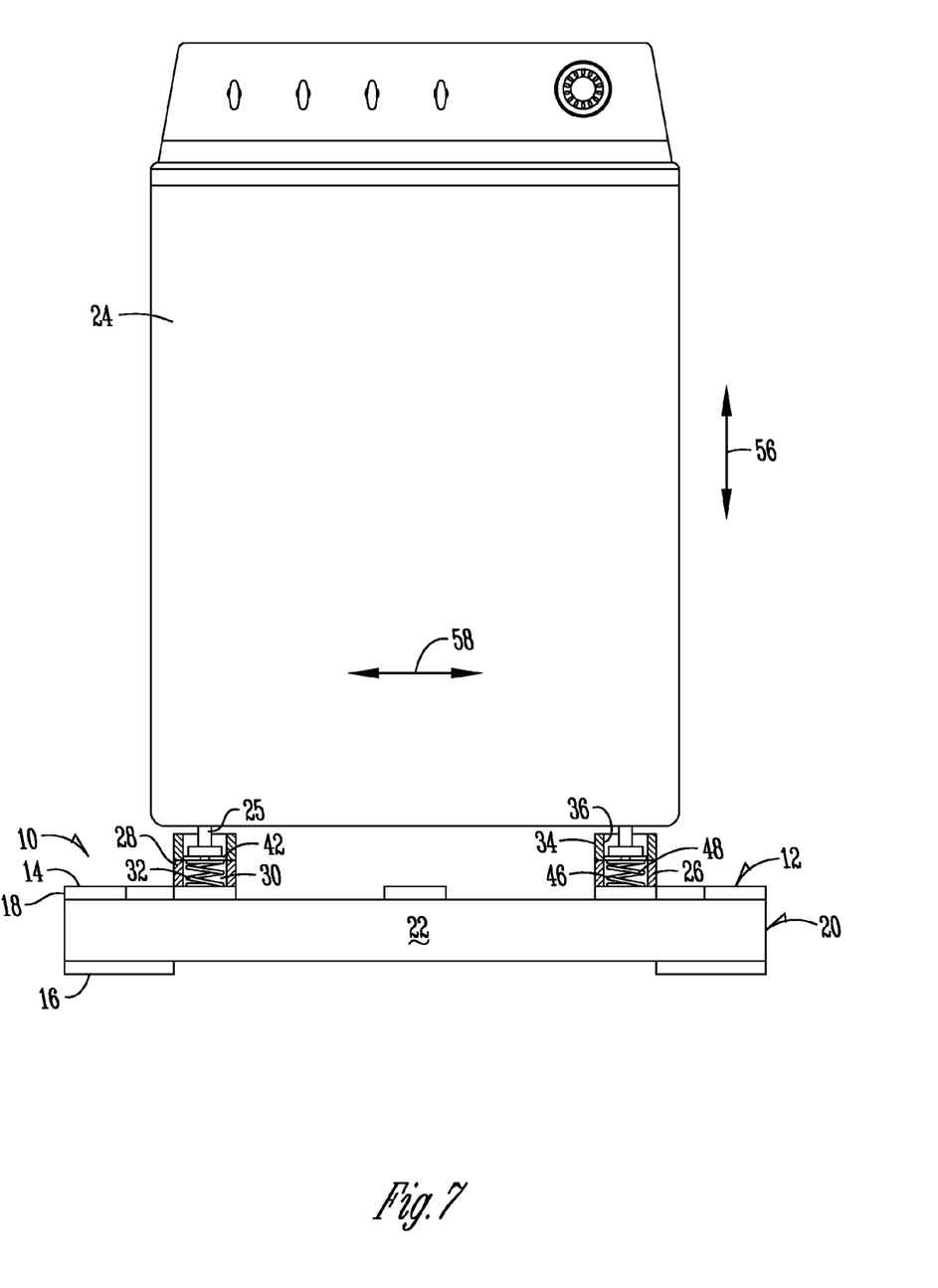
FIG. 7 is a sectional view of a pallet and dampening system according to an embodiment of the present invention.

FIGS. 6 and 7 show another embodiment of the dampening system 10 used with a conventional pallet 12 according to the present invention. The components of the dampening system 10 shown in FIGS. 6 and 7 are generally similar to that of the system 10 shown in FIGS. 1-5. However, in FIGS. 6 and 7, the dampening member 32 is now a compression spring 46, which replaces the domed-shaped pliable member. The system 10 shown in FIGS. 6 and 7 will work generally the same as the system 10 described above. However, the compression spring 46 will now receive the vertical displacement of the item 24 caused by the vibrations and shock of the movement and transport of the item 24 on the pallet 12. The spring 46 may be any compression-type spring suitable for displacing or transferring the vertical movement of the item 24 during movement and transport of the item 24 on the pallet 12. However, one spring that has been found suitable for use with the present invention is a wave spring obtained from Rotor Clip Company, 187 Davidson Avenue, Somerset, N.J. 08873. The present invention contemplates that other models and types of compression springs may be used, and compression springs obtained from other companies may also be used with the dampening system 10 of the present invention.

In addition, while FIGS. 6 and 7 show that transitional members 42 are also used in conjunction with the compression spring 46, it should be appreciated that the spring 46 may include a generally flat or substantially flat surface having similar surface area to that of the transitional member, such that the transitional member 42 may not be required. Thus, the bottom of the feet 25 of the item 24 may be positioned directly adjacent the coils 48 of the springs 46.

Figure 8:
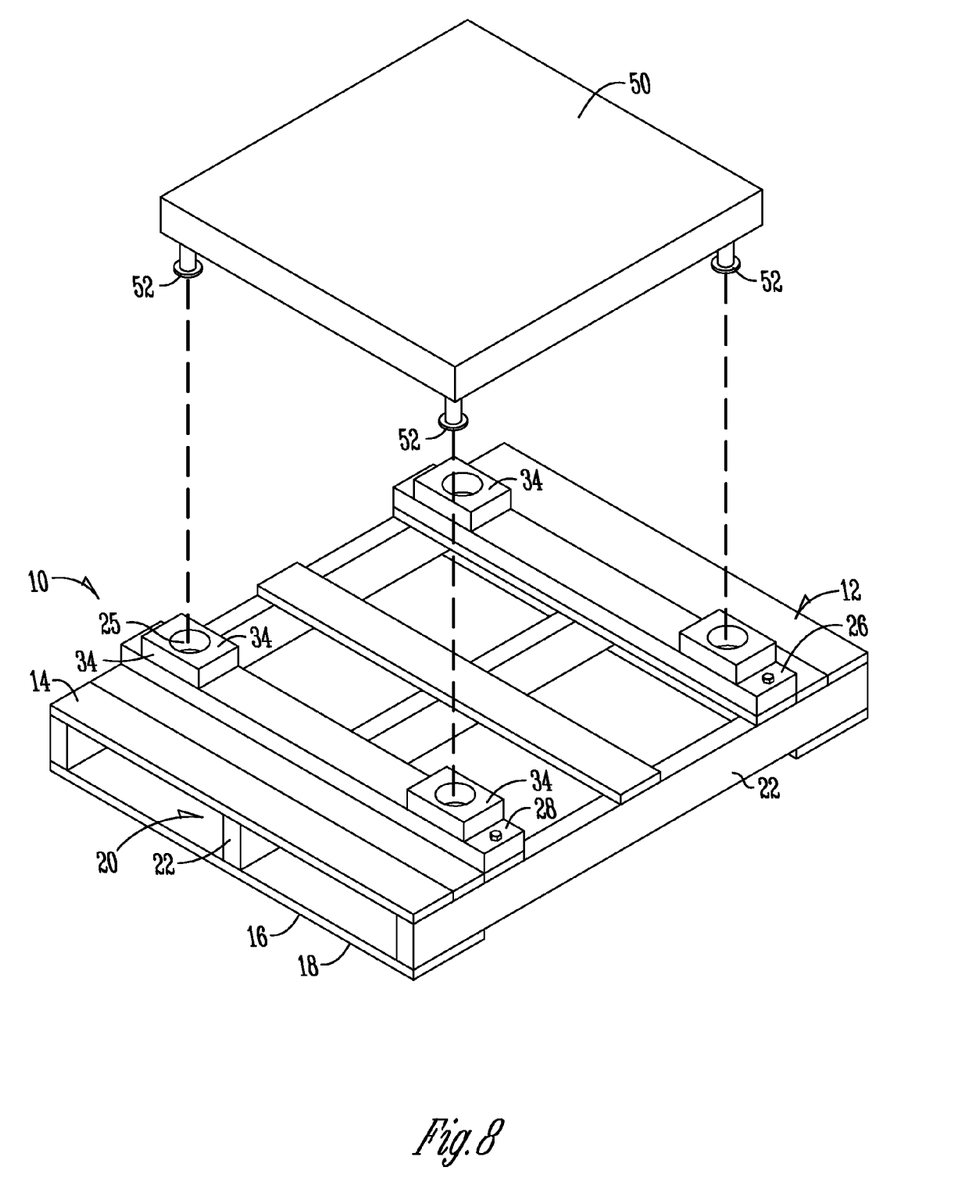
FIG. 8 is a perspective view of a pallet and item including an embodiment of the dampening system of the present invention.
Figure 9:
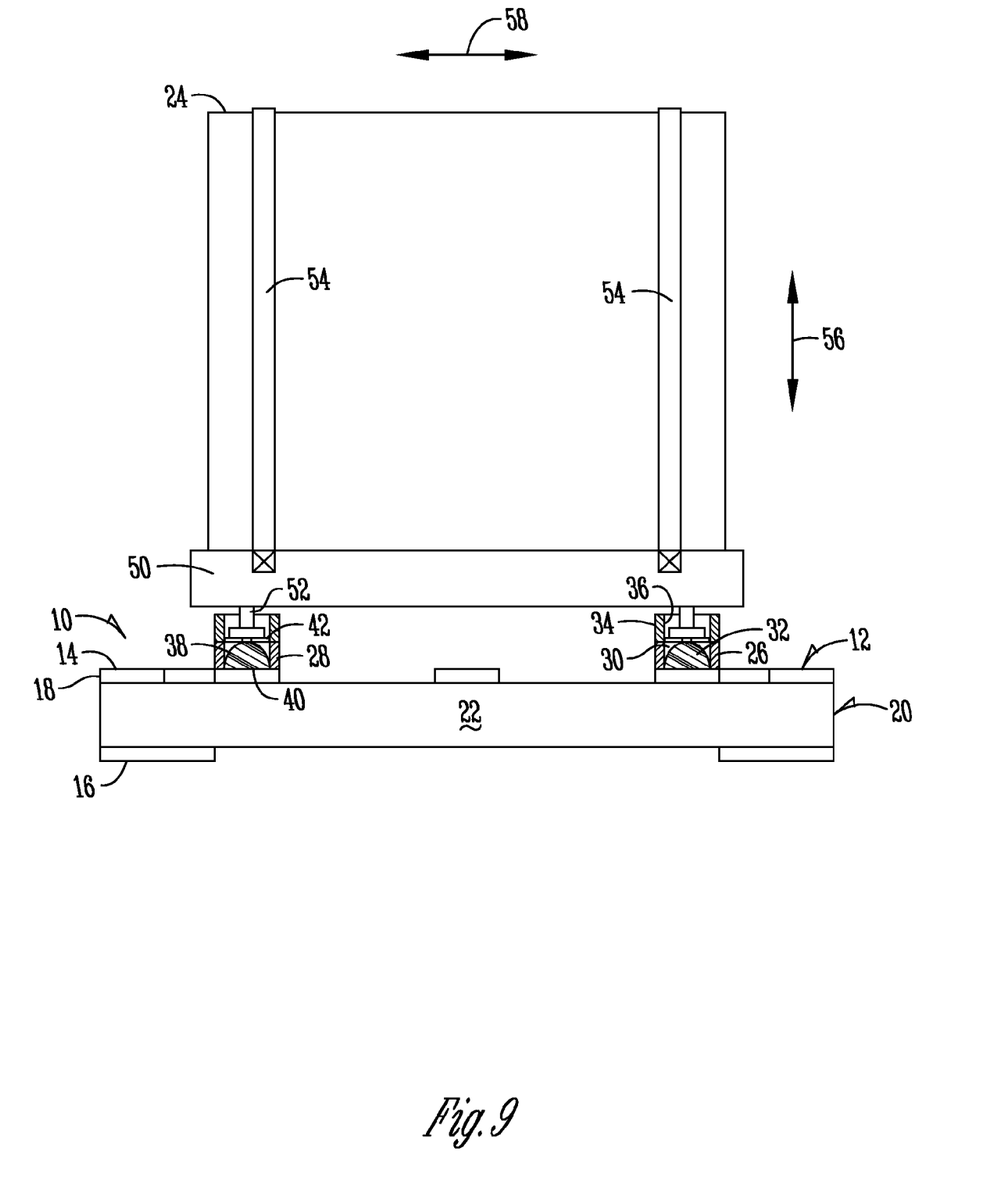
FIG. 9 is a sectional view of the dampening system of FIG. 8 with an item positioned on the pallet and dampening system.

FIGS. 8 and 9 show yet another embodiment of the dampening system 10 according to the present invention. The embodiment shown in FIGS. 1-7 can be used best with appliances or items 24 that include feet 25, such as bullet-type feet, extending generally from the bottom of the item 24. However, when the item 24 or shipping container 24 does not include feet and instead includes a generally planar or flat bottom, the present invention contemplates that a platform 50 including platform legs 52 extending downwardly from the platform may be used. As shown in FIGS. 8 and 9, the platform 50 is a member including generally planar top and bottom surfaces. The bottom side of the platform 50 includes a plurality of legs 52. The legs 52 may be inserted into the block apertures 36 to contact the transitional member 42 and thus the dampening member 32. The item 24 can then be placed on the platform 50 such that the platform 50 and item 24 have reduced stress from the vibration and shock of the transport and movement of the pallet 12 due to the deformation of the dampening member 32 (or compression of the compression spring). The platform legs 52 essentially become the item legs, similar to the legs 25 of the item 24 on previous figures. Furthermore, as shown in FIG. 9, the item 24 can be held in place on the platform 50 by the use of straps 54 on and around the platform and attaching to the platform 50. However, the present invention should not be limited to the use of straps, and other types of constraints or restraints are contemplated to be used with the platform 50 of the dampening system 10.

Furthermore, the present invention contemplates that the platform need not have generally planar top and bottom surfaces. For example, the platform 50 could include protrusions, including walls, which can therefore surround the item 24 on the platform to further aid in restricting the lateral movement 58 during transport and movement of the pallet/item. For example, the walls may be adjustable walls such that the area within the walls may be adjusted to account for varying sizes of items to be transported on the pallet 12. The height of the walls may also be adjusted as needed. Furthermore, the configuration of the walls may be adjusted. For example, the walls may generally be in a square or rectangular shape to account for square or rectangular-shaped items to be shipped. However, the walls may be positioned on a rotating surface such that walls can be removed and added as needed to account for different shapes. For example, when a triangular shaped item is to be shipped, a wall may be removed and the remaining walls rotated such that three walls remain to form a generally triangle shape restraint for the item to be placed therein. The present invention is not to be limited to the configurations disclosed, however, and contemplates that any other additions or changes may be made to the platform 50.

As shown, the present invention includes numerous advantages over prior art. For example, the dampening system 10 of the present invention provides an easy and efficient addition to a conventional pallet 12 that reduces the damage caused by vibration and shock to the pallet 12 during transport and movement of the pallet/item assembly. As noted, the use of the dampening system 10 according to the present invention may reduce the amounts of stress of the appliance by up to 50%, which reduces the likelihood of damage occurring during movement and/or transport of the item on the pallet 12. Furthermore, the dampening system 10 of the present invention provides a cost effective add-on to the conventional pallet such that fewer components are used and added to the pallet. Furthermore, the present invention allows for various configurations of the dampening system 10 to be used to accommodate the various shapes and sizes of items that are transported on the pallets 12.

The foregoing description has been presented for purposes of illustration and description, and is not intended to be an exhausted list or to limit the invention to precise forms disclosed. It is contemplated that other alternative processes obvious to those skilled in the art are considered to be included in the invention. The descriptions are merely examples of embodiments. For example, as noted, the number of components, such as number of sleeves and/or blocks, may be varied according to the item being shipped. Furthermore, the shape or configuration of the components of the dampening system may be adjusted or varied to accommodate the different shapes, sizes, weights, and the like of the items to be shipped on the pallet. Finally, the components may be varied as required according to the type of pallet being used, i.e., wood pallet versus metal pallet versus plastic pallet. In addition, while types of dampening members have been shown and described, the present invention contemplates that any other member capable of reducing the stress due to vertical component of vibration and shock should be included in the present invention, and the present invention is not limited to the specific types of dampening members disclosed therein. It is understood that any other modifications, substitutions, and/or additions, may be made, which are within the intended spirit and scope of the invention. From the foregoing, it can be seen that the present invention accomplishes at least all of the stated objectives.

What is claimed is:

1. A dampening system for use with transporting an item with a plurality of feet extending from the item, comprising:
   first and second sleeves spaced apart from one another;
   a dampening member separate from the plurality of feet of the item positioned within at least one recess of each of the first and second sleeves;
   a transition member positioned between the dampening member and the plurality of feet of the item to transfer load from the feet to the dampening member; and
   a block positioned adjacent the at least one recess of the sleeves to aid in providing lateral stability for the item being shipped;
   said feet of the item extending at least partially through an aperture of the block and into contact with a portion of the dampening member or transition member;
   wherein the first and second sleeves each comprise a plurality of recesses spaced along the lengths of the first and second sleeves.

2. The system of claim 1 wherein the block aperture aligns with the recess of the sleeves.

3. The system of claim 1 further comprising a dampening member positioned within each of the plurality of recesses of the first and second sleeves.

4. The system of claim 3 further comprising a plurality of blocks positioned adjacent each of the plurality of recesses of the first and second sleeves.

5. The system of claim 1 wherein the dampening member is dome-shaped, with a dome portion adjacent the block.

6. The system of claim 5 wherein the transitional member is a disc.

7. The system of claim 1 wherein the dampening member comprises a polyurethane.

8. The system of claim 1 wherein the dampening member comprises a compression spring.

9. A dampening system for use with moving an item with a plurality of feet extending from the item on a pallet having first and second layers of longitudinal extending surface boards attached to one another by a plurality of oppositely extending support boards, the system comprising:
   first and second sleeves secured to the first layer of surface boards of the pallet, the first and second sleeves each comprising at least one recess therein;
   a dampening member separate from the feet of the item and positioned within each of the at least one recess of the first and second sleeves to provide vertical stability for the item;
   a transitional member separate from and positioned between the dampening member and the feet for providing greater surface area to contact the item; and
   a block positioned adjacent each of the at least one recess of the first and second sleeves for providing lateral stability for the item, the blocks including an aperture aligned with the at least one recess; and
   said feet of the item extending at least partially through an aperture of the block and into contact with a portion of the dampening member or transitional member.

10. The system of claim 9 further comprising a plurality of recesses positioned in each of the first and second sleeves.

11. The system of claim 9 wherein the dampening member comprises a dome-shaped piece of polyurethane.

12. The system of claim 9 wherein the dampening member comprises a compression spring.

13. The system of claim 9 wherein the transitional member comprises a disc.

14. The system of claim 9 wherein the first and second sleeves are parallel to one another on the first layer of surface boards.

15. A dampening system for use with moving an item with a plurality of feet extending from the item on a pallet having first and second layers of longitudinal extending surface boards attached to one another by a plurality of oppositely extending support boards, the system comprising:
   first and second sleeves secured to the first layer of surface boards of the pallet, the first and second sleeves each comprising a plurality of recesses therein;

a dampening member separate from the feet and positioned within each of the recesses of the first and second sleeves to provide vertical stability for the item; and a transition member positioned between the dampening member and the plurality of feet of the item to transfer load from the feet to the dampening member;

said feet of the item extending at least partially into said recesses and into contact with the dampening members positioned therein to provide stability for the item.

16. The system of claim 15 wherein the dampening member comprises a dome-shaped member.

17. The system of claim 15 wherein the transitional member comprises a disc-shaped transitional member adjacent the dampening member to provide more surface area for the item.

18. The system of claim 15 further comprising a platform positioned on the first and second sleeves, the platform comprising a plurality of legs extending from a side of the platform and capable of insertion into the recesses of the sleeves adjacent the dampening member.

\* \* \* \* \*